(12) United States Patent
Nowrouzezahrai et al.

(10) Patent No.: US 9,501,862 B2
(45) Date of Patent: Nov. 22, 2016

(54) VISIBILITY SILHOUETTES FOR MASKED SPHERICAL INTEGRATION

(71) Applicant: Disney Enterprises, Inc., Burbank, CA (US)

(72) Inventors: Derek Nowrouzezahrai, Zurich (CH); Ilya Baran, Zurich (CH); Kenny Mitchell, Borders (GB); Wojciech Jarosz, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 438 days.

(21) Appl. No.: 13/692,482

(22) Filed: Dec. 3, 2012

(65) Prior Publication Data

US 2014/0152662 A1 Jun. 5, 2014

(51) Int. Cl.
*G06T 15/50* (2011.01)
*G06T 15/06* (2011.01)
*G06T 15/40* (2011.01)

(52) U.S. Cl.
CPC ............... *G06T 15/06* (2013.01); *G06T 15/40* (2013.01)

(58) Field of Classification Search
None
See application file for complete search history.

(56) References Cited

PUBLICATIONS

Laine et al. (Soft Shadow Volumes for Ray Tracking, 2005).*
Kautz et al. (Hemispherical Rasterization for Self-Shadowing of Dynamic Objects, 2004).*
Praun et al. (Spherical Parametrization and Remashing, 2003).*
Annen et al., "Real-Time, All-Frequency Shadows in Dynamic Scenes," ACM Trans. Graph. 27, 2008, 3, pp. 1-8.
Arvo, J. 1995. Analytic Methods for Simulated Light Transport. PhD thesis, Yale University, 232 pages.
Billeter et al., "Real Time Volumetric Shadows using Polygonal Light Volumes," High Performance Graphics, 2010, 8 pages.
Chen, M. et al., "A Closed-Form Solution for the Irradiance due to Linearly-Varying Luminaires," Proceedings of the Eleventh Eurographics Workshop on Rendering, Jun. 2010, pp. 137-148.
Chen, J. et al., "Real-Time Volumetric Shadows using 1D Min-Max Mipmaps," Proceedings of ACM SIGGRAPH Symposium on Interactive 3D Graphics and Games, 2011, 7 pages.
Decarlo et al., "Suggestive Contours for Conveying Shape," ACM 531 Transactions on Graphics (Proc. SIGGRAPH) Jul. 22, 2003, pp. 848-855.
Durand et al., "The 3D Visibility Complex," ACM Transactions on Graphics 21(2), 2002, pp. 176-206.
Ghosh et al., "Correlated visibility sampling for direct illumination," The Visual Computer (Impact Factor: 1.07). Sep. 2006; 22(9-11): pp. 693-701.
Hertzmann et al., "Illustrating smooth surfaces," in SIGGRAPH, ACM Press/Addison-Wesley Publishing Co., 2004, 10 pages.
Jarosz et al., "Importance Sampling Spherical Harmonics," vol. 28, Issue 2, pp. 577-586, Apr. 2009, pp. 577-586.

(Continued)

*Primary Examiner* — Kyle Zhai
(74) *Attorney, Agent, or Firm* — Patterson + Sheridan, LLP (57) ABSTRACT

The disclosure provides an approach for determining, in 3D rendering, the integrals of visibility-masked spherical functions using visibility silhouettes. For a given shade point, the visibility silhouette for that shade point includes a set of edges from the scene geometry which form the boundaries between visible and invisible regions of a hemisphere having the shade point as its center. For each shade point, a rendering application determines a set of contour edges of scene geometry, the contour edges being a superset of the set of visibility silhouette edges, by querying a 4D dual mesh. The rendering application then evaluates the integral of the visibility-masked spherical function for a given shade point by integrating over segments of discrete u-isolines for which an overlap function indicates that a ray from the shade point would not intersect scene geometry.

12 Claims, 4 Drawing Sheets

(56) References Cited

PUBLICATIONS

Kautz et al., "Hemispherical rasterization for self-shadowing of dynamic objects," Proceedings of the 15th Eurographics Association, 2004, 6 pages.

Loos et al., "Volumetric obscurance," Proceedings of the 2010 Symposium on Interactive 3D Graphics, SI3D 2010, 6 pages.

McGuire, M., "Ambient occlusion volumes," ACM SIGGRAPH Symposium on Interactive 3D Graphics and Games 2010, 1 page.

Ng et al., "All-frequency shadows using non-linear wavelet lighting approximation," ACM Transactions on Graphics (Impact Factor: 3.73). Jul. 2003; 22(3), pp. 376-381.

Ng et al., "Triple product wavelet integrals for all-frequency relighting," ACM Transactions on Graphics—TOG Jan. 2004, 11 pages.

Nguyen et al., "A PCA decomposition for real-time BRDF editing and relighting with global illumination," Computer Graphics Forum (Impact Factor: 1.6). Jun. 2010; 29(4), pp. 1469-1478.

Overbeck et al., "Adaptive Wavelet Rendering," ACM Transactions on Graphics (Impact Factor: 3.73). Dec. 2009; 28(5), 12 pages.

Pantaleoni et al., "Pantaray: Fast ray-traced occlusion caching of massive scenes," ACM Transactions on Graphics (Impact Factor: 3.73). Jan. 2010; 29, 10 pages.

Praun et al., "Spherical parameterization and remeshing," ACM Transactions on Graphics (Impact Factor: 3.73). Jul. 2003; 22(3), 10 pages.

Ramamoorthi et al., "An efficient representation for irradiance environment maps," Sep. 2002; DOI: 10.1145/383259.383317, 4 pages.

Ramamoorthi et al., "Frequency space environment map rendering," ACM Transactions on Graphics (SIGGRAPH), 2002, pp. 517-526.

Ramamoorthi et al., "A first-order analysis of lighting, shading, and shadows," ACM Transactions on Graphics (Impact Factor: 3.73). Jan. 2007; 26, pp. 1-21.

Ren et al., "Real-time soft shadows in dynamic scenes using spherical harmonic exponentiation," ACM Transactions on Graphics (Impact Factor: 3.73). Jul. 2006; 25(3), 10 pages.

Ritschel et al., "Imperfect shadow maps for efficient computation of indirect illumination," ACM Transactions on Graphics (Impact Factor: 3.73). Dec. 2008; 27(5), 8 pages.

Roth, S. D., "Ray casting for modelling solids," Computer Graphics and Image Processing 18, 2 (Feb.), pp. 109-144.

Scherzer et al., "A survey of real-time hard shadow mapping methods," Computer Graphics Forum (Impact Factor: 1.6). Mar. 2011; 30(1), pp. 1-17.

Sloan et al., "Precomputed radiance transfer for real-time rendering in dynamic, low-frequency lighting environments," ACM Transactions on Graphics (Impact Factor: 3.73). Jul. 2002; 21(3), 10 pages.

Sloan et al., "Image-based proxy accumulation for real-time soft global illumination," Computer Graphics and Applications, 2007. PG '07. 15th Pacific Conference, pp. 1-9.

Sloan et al., "Normal mapping for precomputed radiance transfer," Proceedings of the 2006 Symposium on Interactive 3D Graphics, SI3D 2006, Mar. 14-17, 2006, 5 pages.

Sloan et al., "Stupid spherical harmonics (sh) tricks," Game Developers Conference Jan. 2008, 42 pages.

Tsai et al., "All-frequency precomputed radiance transfer using spherical radial basis functions and clustered tensor approximation," ACM Trans. Graph. 25 (July), 10 pages.

Wang et al., "All-frequency rendering of dynamic, spatially-varying reflectance," ACM Transactions on Graphics (Impact Factor: 3.73). Dec. 2009; 28(5), 10 pages.

Williams, L., "Casting curved shadows on curved surfaces," ACM SIGGRAPH Computer Graphics (Impact Factor: 1.13). Aug. 1978; 12(3): pp. 270-274.

Zhou et al., "Pre-computed shadow fields for dynamic scenes," In ACM SIGGRAPH 2005 Papers, ACM, NY, USA, SIGGRAPH '05, 6 pages.

\* cited by examiner

VISIBILITY SILHOUETTES FOR MASKED SPHERICAL INTEGRATION

BACKGROUND

1. Field

Embodiments presented herein provide techniques for rendering 3D geometry and, in particular, using visibility silhouettes to determine integrals of visibility-masked spherical functions.

2. Description of the Related Art

A spherical visibility function encodes occlusion from surrounding geometry at each point of a scene. Determining the visibility function is often a bottleneck in three-dimensional (3D) rendering when it is necessary to integrate visibility-masked spherical functions. Typically, the visibility function is determined via sampling, such as ray tracing or hardware shadow mapping. However, such approaches are not geometric in nature. Further sampling approaches can leave artifacts in the rendered scenes.

SUMMARY

One embodiment of the invention includes a computer implemented method which includes receiving geometry of a scene, and, for each of a plurality of shade points in the scene, determining a visibility silhouette having edges which define boundaries between visible and occluded regions from a perspective of the shade point. The method further includes determining a spherical visibility-masked integral in which spherical visibility is represented by the visibility silhouette.

Other embodiments include a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

It is to be noted, however, that the appended drawings illustrate only typical aspects of this invention and are therefore not to be considered limiting of its scope, for the invention may admit to other equally effective aspects.

DETAILED DESCRIPTION

Embodiments disclosed herein provide techniques for determining, when rendering 3D geometry, integrals of visibility-masked spherical functions using visibility silhouettes. In particular, the integrals of the visibility-masked spherical functions are converted to integrals over the visibility silhouettes. For a given shade point, the visibility silhouette for that shade point includes a set of edges from the scene geometry which form the boundaries between visible and occluded regions of a hemisphere having the shade point as its center. That is, a visibility silhouette traces the boundary of the union of the objects in the scene.

In one embodiment, a rendering application determines contour edges, discussed in greater detail below, of scene geometry for each shade point by querying a 4D dual mesh. The contour edges are a set of locally defined edges which include edges of a visibility silhouette. The rendering application may determine the integral of the visibility-masked spherical function for a given shade point by integrating over segments of discrete u-isolines, for which an overlap function indicates that a ray from the shade point would not intersect scene geometry. In one embodiment, a spherical parameterization is used, with u and v coordinates being azimuthal and zenith angles, respectively. In another embodiment, an octahedral parameterization is used, with u and v coordinates being the x and y coordinates of a unit octahedron $|x|+|y|+|z|=1$. The integral of the visibility-masked spherical function may be useful in a number of 3D rendering computations, such as direct illumination, ambient occlusion computations, the precomputation steps of pre-computed radiance transfer (PRT) techniques, image relighting, all-frequency diffuse shading, glossy rendering, material editing, and the like.

The following description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Figure 1:
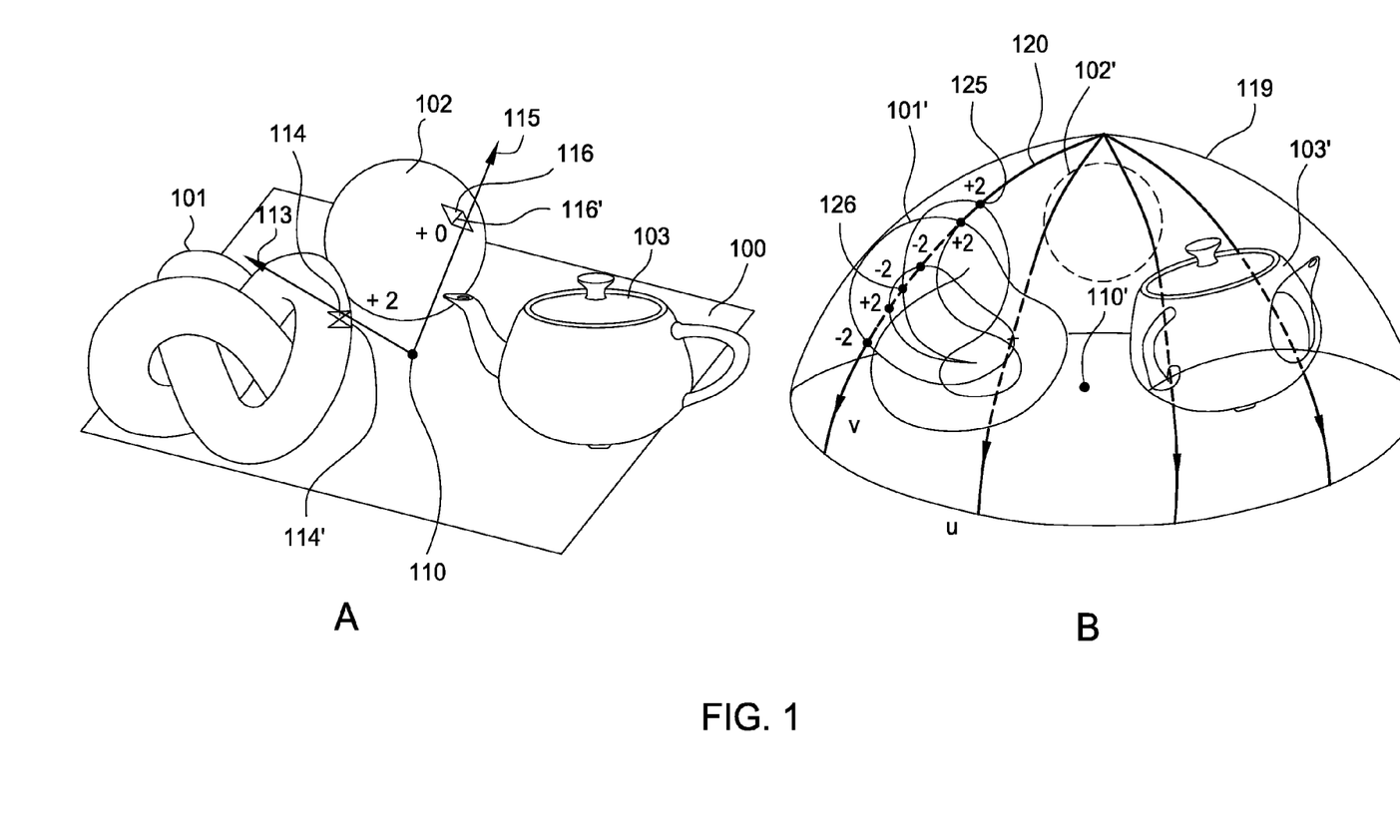
FIG. 1 illustrates an approach for determining an integral of a visibility-masked spherical function, according to an embodiment of the invention.

FIG. 1 illustrates an approach for determining an integral of a visibility-masked spherical function, according to an embodiment. As discussed, computing the integral of visibility times an arbitrary function is performed in a variety of rendering applications, such as direct illumination, ambient occlusion computations, the precomputation steps of PRT techniques, image relighting, all-frequency diffuse shading, glossy rendering, material editing, etc. In each of these applications, a rendering application may determine the integral of a spherical function $f(\omega)$ times visibility, represented mathematically as:

$$I = \int_{S^2} V(\omega) f(\omega) d\omega, \tag{1}$$

where $S^2$ is the unit sphere and $f$ is a scalar or vector valued function appropriate for the rendering application. Because visibility is binary, equation (1) may be rewritten as:

$$I = \int_{\{\omega | V(\omega) = 1\}} f(\omega) d\omega, \tag{2}$$

In an embodiment, the rendering application computes the integral of equation (2) over unoccluded region $\{\omega | V(\omega) = 1\}$ using a visibility silhouette which represents edge boundaries between visible and invisible regions.

Finding simply silhouette edges is a challenging problem, because whether a given edge is a silhouette edge or not may depend on the existence (or absence) of occluding geometry which is far from the edge. In one embodiment, the rendering application may first determine contour edges, which include the set of silhouette edges, and determine the silhouette edges therefrom. As discussed in greater detail below, contour edges may be defined as all edges for which an overlap function $W(\omega)$ changes by ±1 or ±2. The overlap function $W(\omega)$ counts the number of times a ray cast from a shade point intersects scene geometry, as the ray crosses the edge.

Illustratively, panel A depicts an example scene 100 which includes a plane 100, a torus knot 101, a sphere 102, and a teapot 103. As shown, rays 113 and 115 originate from a shade point 110 at the center of the plane 110 and intersect geometry of the torus knot 101 and the sphere 115, respectively. As discussed, the overlap function $W(\omega)$ counts the number of times a ray from shade point 110 intersects scene geometry. If an edge is a boundary edge, i.e., is adjacent to only one triangle, then the ray in direction $\omega$ will go from not intersecting the one triangle to intersecting the triangle, or vice versa. In such a case, the value of the overlap function W would change by ±1 as the ray crosses the edge, as the number of times scene geometry is intersected increases or decreases by 1. If, on the other hand, the edge is adjacent to two triangles (i.e., forms the boundary between two triangles), then there are two possibilities: the ray may go from intersecting one of the triangles to intersecting the other triangle, or the ray may go from intersecting neither triangle to intersecting both triangles. Assuming the triangles are oriented consistently, if the shade point sees the fronts of both triangles or the backs of both triangles, such as for the triangles adjacent to edge 116', then the first possibility occurs and the value of the overlap function W does not change, as the ray merely intersects the first triangle, then the second. If, however, the shade point sees the front of one triangle and the back of the other, such as for the triangles adjacent to edge 114', then the value of the overlap function W changes by ±2 when the edge is crossed, as the ray intersects two triangles after intersecting no triangles, or vice versa. As discussed, such cases in which the value of the overlap function W changes by ±2 as the edge is crossed, as well as boundary cases where the value of the overlap function W changes by ±1, indicate a contour edge. In one embodiment, discussed in greater detail below, the rendering application may use a dual-space bounding volume hierarchy (BVH) to determine the contour edges.

Given the set of contour edges, the rendering application may use 2D geometric booleans to determine which contour edges are actually silhouette edges, but such a procedure tends to be costly and error-prone. Instead, the dimensionality of the problem may be reduced by parameterizing the sphere by u and v, and rewriting the integral in equation (2) as $$I = \int_u (\int_{\{v | V(u,v) = 1\}} f(u,v) J(u,v) dv) du \tag{4}$$

where $$J(u, v) = \left\| \frac{d\omega}{du} \times \frac{d\omega}{dv} \right\|.$$

The spherical parameterization may be accomplished in various ways. As shown in panel B, the parameterization may simply use spherical angles, with the u and v coordinates being azimuthal and zenith angles, respectively. In such a case, the contour edges may be projected onto a sphere (e.g., the unit sphere) having the shade point as its center.

Given the spherical parameterization, the rendering application may compute the integral of equation (4), by determining the overlap W along discrete u-isolines and evaluating the integral along v for segments of the u-isolines where the overlap W is, e.g., 0 such that a ray from the shade point never intersects scene geometry. In particular, for a single value of u, the region $\{v | V(u, v) = 1\}$ is a set of disjoint intervals, so equation (4) may be rewritten as $$I = \int_u \sum_i^{N(u)} \left( \int_{v_i^-(u)}^{v_i^+(u)} f(u, v) J(u, v) dv \right) du, \tag{5}$$

where N(u) is the number of intervals and $[v_i^-(u), v_i^+(u)]$ is the i-th interval. By discretizing along the u dimension, the 2-D problem of equation (6) may be decomposed into a set of 1D problems:

$$I = \sum_u \sum_i^{N_u} \left( \int_{v_{i,u}^-}^{v_{i,u}^+} f(u, v) J(u, v) dv \right) \Delta u, \qquad (6)$$

where $N(u)$, $v_{i,u}^-$, and $v_{i,u}^+$ are the discrete analogs of the continuous variables $N(u)$, $v_i^-(u)$, and $v_i^+(u)$. Here, equation (6) may be evaluated as discussed above, namely by computing the overlap W along discrete u-isolines and evaluating the innermost integral along segments of the u-isolines where there the overlap is, e.g., 0.

In one embodiment, a bucket may be associated with each u-isoline for storing v values of intersections of the u-isoline with contour edges, as well as changes in the value of the overlap function W across those contour edges. The rendering application may then sort the buckets to obtain the changes in W in order of increasing v for each bucket. As discussed in greater detail below, the rendering application may traverse the sorted buckets to incrementally compute the value of W for each v based on the changes in W and integrate $f(u, v)J(u, v)$ over segments of the u-isolines where the value of W is zero.

Illustratively, panel B depicts the projection of contour edges onto a visible hemisphere 119. As shown, the overlap W changes at various v values along u-isoline 120 where the u-isoline 120 intersects the contour edges of the torus knot 101'. For example, the overlap W changes by +2 at the value of v where a ray crossing a contour edge begins to intersect the geometry of the torus knot 101' at point 125. At values of v where a ray crossing a contour edge intersects further geometry of the torus knot 101', the value of the overlap function W increases further. Conversely, the overlap W decreases where a ray crossing a contour edge leaves some geometry of the torus knot 101', such as at point 126, where the overlap W changes by −2. Note, although only four u-isolines are shown in panel B, more (or fewer) u-isolines may be used.

By sorting the changes of W in order of increasing v values and traversing the sorted changes, the rendering application may determine that the value of W between points 125 and 126 is nonzero because, assuming W begins at 0, the value of W then becomes, 2, 4, 2, and 0 again between points 125 and 126, inclusive. Here, the nonzero value of W indicates a lack of visibility, as a ray from the shade point 110' would intersect some scene geometry where W is nonzero. As a result, the rendering application may not integrate $f(u, v)J(u, v)$ over the segment of the u-isoline 120 between points 125 and 126. Conversely, the rendering application may integrate $f(u, v)J(u, v)$ over segments of the u-isoline 120 where W is zero, such as between the north pole of the hemisphere 119 and the point 125.

Figure 2:
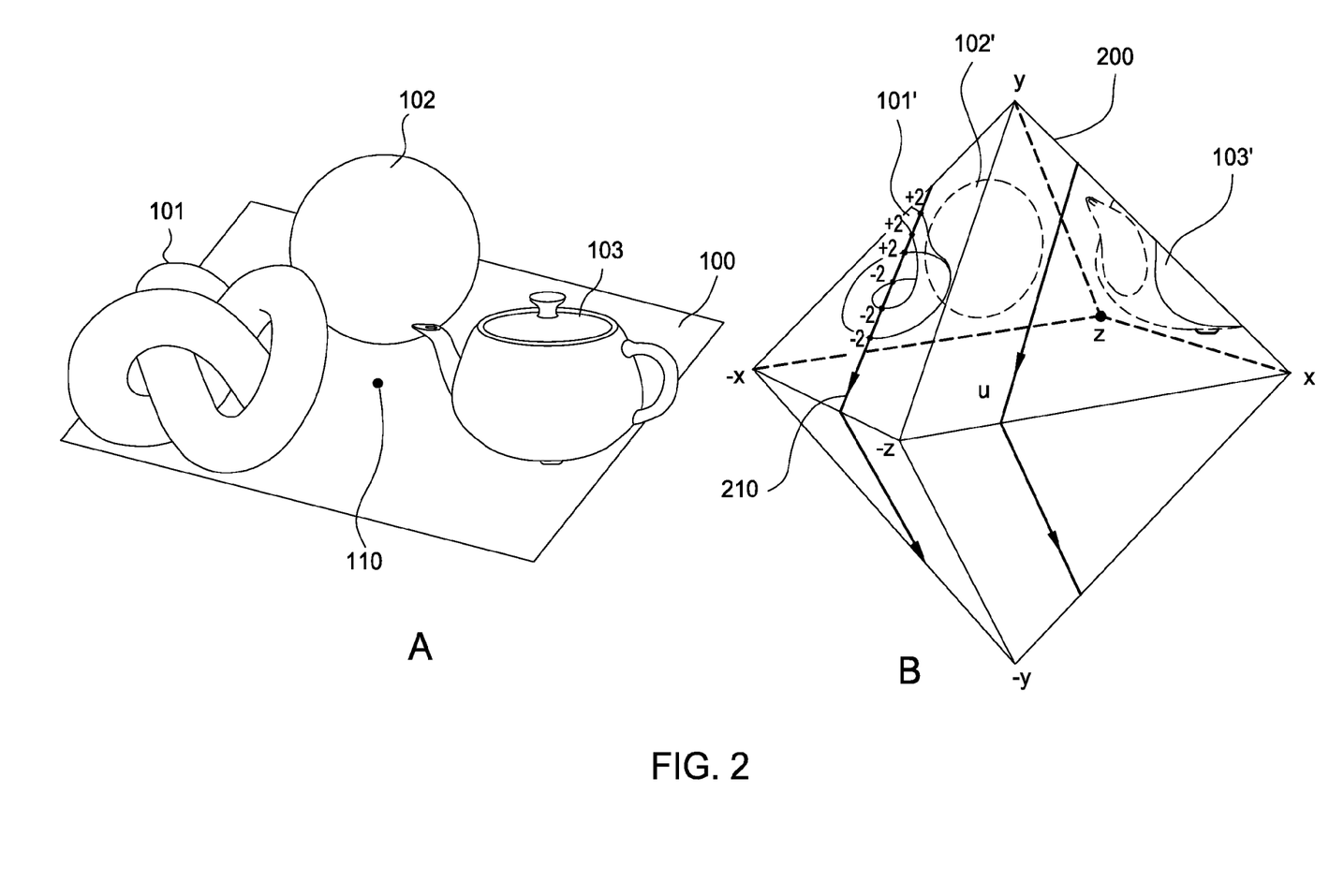
FIG. 2 illustrates an alternative approach for determining an integral of a visibility-masked spherical function, according to an embodiment of the invention.

FIG. 2 illustrates an alternative approach for determining an integral of a visibility-masked spherical function, according to an embodiment. Panel A shows the same scene 100 as that depicted in Panel A of FIG. 1. Illustratively, the scene 100 includes the plane 100, the torus knot 101, the sphere 102, and the teapot 103. Panel B shows an octahedral parameterization in which contour edges are projected onto an octahedron (e.g., the unit octahedron), as opposed to the sphere of FIG. 1, Panel B. Such an octahedral projection has the property that, within an octant, straight lines map to straight lines. Illustratively, the u coordinate may simply be chosen as the x coordinate of the projection mapping coordinates (x,y,z) to $$\frac{(x, y, z)}{|x| + |y| + |z|}$$

of, e.g., the unit octahedron $|x|+|y|+|z|=1$. Similarly, the v coordinate may be chosen as the y coordinate of such a projection. As discussed in greater detail below, the property that straight lines map to straight lines within an octant simplifies the computation of intersections of u-isolines (e.g., u-isoline 210) with contour edges. Similar to the discussion for panel B of FIG. 1, the rendering application may integrate $f(u, v)J(u, v)$ over segments of the u-isoline 210 where a value of an overlap function W is, e.g., zero, thereby indicating visibility. Note, although only two u-isolines are shown in panel B, more (or fewer) u-isolines may be used.

Figure 3:
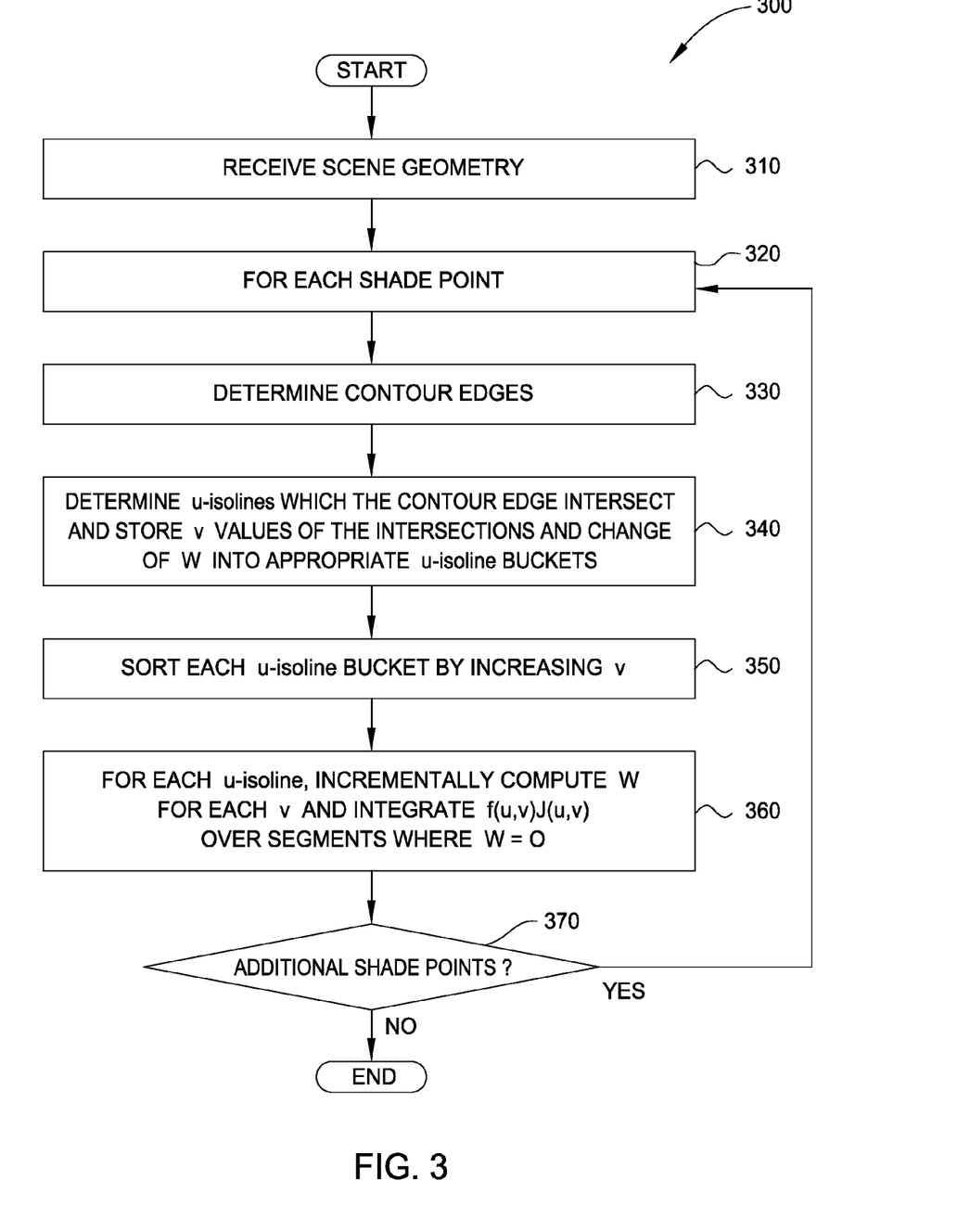
FIG. 3 illustrates a method for determining visibility silhouettes and using the same in 3D rendering, according to an embodiment of the invention.

FIG. 3 illustrates a method 300 for determining visibility silhouettes and using the same in 3D rendering, according to an embodiment. As shown, the method 300 begins at step 310, where a rendering application receives scene geometry for rendering. At step 320, the rendering application enters a loop over shade points.

At step 330, the rendering application determines contour edges. The set of contour edges, defined below, is a superset of the set of silhouette edges. Whether an edge is a silhouette edge may depend on occluding geometry far from the edge. In contrast, contour edges are defined locally and, as discussed in greater detail below, may be found using a dual-space bounded volume hierarchy (BVH). In one embodiment, silhouette edges may be determined from such contour edges.

At a given shade point p, let the visibility function $V(\omega)$ return whether a ray starting from p and pointing towards direction $\omega$ intersects any scene geometry. By this definition, the visibility function $V(\omega)$ is piecewise constant (in fact, binary) and the value of the function changes when the ray crosses edges of the scene geometry which are silhouette edges. Let the overlap function $W:S^2 \to \mathbb{N}_0$ be defined as follows: for a given direction $\omega$, $W(\omega)$ is the number of times a ray in direction $\omega$ intersects scene geometry. Note, the overlap function W generalizes the visibility function V, because each intersection of scene geometry is individually counted by W.

Assuming the scene is represented with a triangle mesh, consider what happens to $W(\omega)$ as $\omega$ varies so that the ray in direction $\omega$ crosses a triangle edge e. If edge e is a boundary edge, i.e., is adjacent to only one triangle, then the ray in direction $\omega$ will go from not intersecting the one triangle to intersecting the triangle, or vice versa. In such a case, $W(\omega)$ would change by ±1 as the ray crosses edge e, as the number of times scene geometry is intersected increases or decreases by 1. If, on the other hand, edge e is adjacent to two triangles (i.e., forms the boundary between two triangles), then there are two possibilities: the ray may go from intersecting one of the triangles to intersecting the other triangle, or the ray may go from intersecting neither triangle to intersecting both triangles. Assuming the triangles are oriented consistently, if the shade point p sees the fronts of both triangles or the backs of both triangles, then the first possibility occurs and the value of W does not change, as the ray in direction $\omega$ merely intersects the first triangle, then the second. If, however, the shade point sees the front of one triangle and the back of the other, then W changes by ±2 when the edge is crossed, as the ray in direction ω intersects two triangles after intersecting no triangles, or vice versa. From the foregoing possibilities, it is apparent that W changes when an edge is crossed if and only if:

$$\text{sign}(f_1 \cdot p) \neq \text{sign}(f_2 \cdot p), \quad (3)$$

where $f_1$ and $f_2$ are plane equations of the two triangles adjacent to shade point p, expressed as 4D vectors (the first three components being the normal of the triangle and the fourth the offset), and p is the shade point expressed in homogenous coordinates.

The contour edges for shade point p may be defined as the mesh boundary edges, discussed above, and edges that satisfy equation (3). The set of contour edges includes the set of silhouette edges, as every silhouette edge must also be a boundary edge or satisfy equation (3). Mesh boundary edges are the same for every shade point and may be found by, e.g., looping over all edges and identifying those edges which are not shared by more than one triangle. As to non-boundary edges, one embodiment avoids testing whether each such edge e satisfies equation (3) by instead treating each edge as a line segment in 4D space with endpoints $f_1$ and $f_2$. Together, such line segments form a mesh dual and may be processed into a 4D BVH. To find contour edges, the rendering application may query the BVH for intersection with a 3D hyperplane normal to shade point p. Doing so exploits the fact that, typically, only a small percentage of triangle edges in a scene are contour edges. Note, when a normal n is specified with the shade point, the rendering application is interested in the visible half-space $(x-p) \cdot n \geq 0$. As a result, the rendering application may filter out (and not consider) contour edges with both endpoints in the invisible half-space.

At step 340, the rendering application determines u-isolines which the contour edges intersect and stores v values of the intersections and changes of W at the intersections into appropriate u-isoline buckets. Based on the above definition of the overlap function W, the value of W necessarily changes at intersections of contour edges and u-isolines. The rendering application may use buckets to store such v values of the intersections and changes of W (±1 or ±2) at the intersections on a per-u-isoline basis. That is, for each u-isoline, a bucket may be maintained which stores v values of the intersections and changes of W.

In one embodiment, a sphere onto which edges are projected may be parameterization using spherical angles, and the u and v coordinates may be azimuthal and zenith angles. In such a case, the all u-isolines may start at the north pole, and, as long as the north pole is in the visible half-space, u-isolines which cross into the invisible half-space never cross back into the visible half-space. If the north pole is instead in the invisible half-space, then the direction of u-isolines may simply be reversed, and the isolines may start from the south pole. Unfortunately, under the spherical angles parameterization, expensive trigonometric computations are required to compute v coordinates of edge intersections with u-isolines.

To avoid the expensive trigonometric computations, in one embodiment, the rendering application may project the edges through the origin onto a unit octahedron $|x|+|y|+|z|=1$ instead of a sphere. Such an octahedron projection maps (x,y,z) to $$\frac{(x, y, z)}{|x|+|y|+|z|}$$

and has the property that, within an octant, straight lines map to straight lines. In one embodiment, the x and y coordinates of the projection may be taken as u and v coordinates, respectively, and then the z coordinate is determined up to a sign, with a set of buckets for +z and a set of buckets for −z. As a result, for any edge within an octant, the v coordinate of the intersection of the u-isolines with the projection of that edge may be a simple linear function of u and would not require trigonometry to evaluate. The change of variables term of this parameterization is $$J(u,v) = (u^2+v^2+(1-|u|-|v|)^2)^{1.5}. \quad (5)$$

At step 350, the rendering application individually sorts each of the u-isoline buckets by increasing v values. By so doing, the rendering application obtains changes in the value of the overlap function W in order of increasing v. For example, given a spherical parameterization in which u and v coordinates are azimuthal and zenith angles, respectively, with u-isolines starting at the north pole, the overlap function W may equal zero at v=0 (i.e., the north pole) if no occluding geometry lies at the north pole. As discussed, the value of W may then increase by ±1 or ±2 for a u-isoline as v increases if that u-isoline intersects additional scene geometry, and vice versa.

At step 360, the rendering application incrementally computes W for each v and integrates $f(u, v)J(u, v)$ over segments where W=0. Any feasible integration technique may be used to compute such integrals of $f(u, v)J(u, v)$. For example, a numerical quadrature over the (u, v) domain may be used for the integral or, alternatively, a Monte Carlo estimator may be used.

As discussed, the spherical function $f(u, v)$ used will depend on the particular application to 3D rendering. For example, in the computation of ambient occlusion, the function $f(\omega) = \max(0, n \cdot \omega)$ may be used. Note, ambient occlusion may also refer to average visibility, omitting a cosine fall-off. In such a case, the function $f(\omega)=1$ may be used.

As another example, techniques disclosed herein may be used to accelerate the precomputation of basis-space projections of visibility in PRT triple-product relighting. In such a case, $f(\omega)=B(\omega)$, where B is a vector-valued function with individual basis-function elements. In one embodiment, the real-valued spherical harmonic basis (SH) functions, B=y, which admit convenient formulas for definite integral computations, may be used. In general, any basis that permits a double or triple product shading formulation may be used, including tabulated data-driven bases. Note, by multiplying B with an arbitrary $f$, the projection of visibility-masked functions onto a basis can also be computed.

In image-relighting PRT techniques, which are distinguishable from geometry PRT techniques discussed above, the viewer is fixed while the lighting is manipulated at run-time. In such a case, the rendering application may integrate the product of visibility and a view-evaluated bidirectional reflectance distribution function (BRDF), $f_r(\omega_i, \omega_o)$ weighted by cosine foreshortening: $f(\omega)=f_r(\omega, \omega_o)\max(n \cdot \omega)$, where $\omega_o$ is a fixed viewing direction.

Yet another example application is all-frequency diffuse shading. Diffuse shading is the convolution of a clamped cosine kernel aligned along normal n with an incident radiance. This kernel may be clamped to the upper hemisphere, so a sharp discontinuity along the equator in the angular domain causes infinite frequencies in its SH projection. By incorporating hemispherical visibility clamping into a computation of incidence radiance before projecting into SH, all-frequency shadows may be computed with a frequency limited unclamped cosine, requiring only a three-SH coefficient dot product, as opposed to the nine coefficients used in the prior art. In particular, diffuse direct illumination may be computed as the following integral:

$$I=\rho/\pi \int_{S^2} L_{in}(\omega)V(\omega)H(\omega,n)(n\cdot\omega)d\omega, \quad (7)$$

where the hemispherical clamping function $H(\omega, n)$ is 1 where $n\cdot\omega>0$ and 0 otherwise. The integral of a product of two spherical functions is the dot product of their SH projection coefficient vectors. Prior art approaches projected the functions $L_{in}(\omega)$ and $V(\omega)H(\omega, n)(n\cdot\omega)$ into SH, because this enabled runtime manipulation of lighting for static geometry. Both of these terms have unbounded frequency content, which means that an accurate computation of the dot product of their coefficients requires infinitely many terms. It has been observed that most of the frequency content is concentrated in the first three SH bands, so a 9-coefficient, order-3 SH projection captures most of the energy of the SH projection.

In contrast, incident light may be decoupled from $n\cdot\omega$ to avoid precomputing a SAT according to embodiments disclosed herein. In particular, the hemispherical clamping function may be incorporated into computation of a visibility silhouette integration of $L_{in}$, treating the clamping function as part of visibility. The remaining function $n\cdot\omega$ is uncampled and has bounded frequency-content. Such an unclamped cosine kernel only has non-zero SH projection coefficients in the linear SH band. This property enables the rendering application to compute the integral of the product of $L_{in}$ and $n\cdot\omega$ exactly using a single SH band, meaning only the linear band of the SH projection of $L_{in}(\omega)H(\omega, n)$ needs to be retained. In one embodiment, the spherical function $f(\omega)=L_{in}(\omega)H(\omega, n)y_1(\omega)$, where $y_1(\omega)$ is a vector valued function with three linear SH basis functions as its elements. In further embodiments, the SH representation of incident radiance discussed above may be extended to (circularly symmetric) non-diffuse BRDFs where, unlike the prior art, the correct outgoing radiance may be computed with a bounded number of coefficients (e.g., 3 coefficients for diffuse). For example, the unclamped Phong kernel has been used in frequency-space relighting and typically introduces error by considering the lighting in the invisible bottom hemisphere. Such errors would not be introduced using clamped incidence radiance.

In a further example application to glossy rendering, the rendering application may determine an optimal SH projection of incidence radiance per-shade point depending on the spatially varying BRDF. For diffuse materials, spherical harmonics band index l=1 may be used, whereas for Phong materials the SH expansion order may be chosen according to guidelines known the art. As opposed to choosing a maximum SH order a prior, such an approach guarantees that additional computation is only performed as needed.

In yet another example application to material editing, the spherical function $f(\omega)=L_{in}(p, \omega)max(0, n\cdot\omega)y(\omega)$ with a predetermined number of basis functions. At runtime, a basis projection of $f_r(\omega, \omega_o)$ may be computed, and the rendering application may determine the final shade by computing a dot product of projection coefficients.

At step 350, the rendering application determines whether there are additional shade points. If such is the case, the method 300 returns to step 230, and the rendering application performs steps 330-360 for another shade point. Here, shade points may be sampled arbitrary. That is, any shading resolution, and any shading order, may be used. In some embodiments, adaptive sampling and edge-aware unsampling may be used.

Although discussed above with respect to per-pixel shading, in some embodiments, the integral of the spherical function times visibility may not be computed on a per-pixel basis. For example, PRT transfer vectors may be determined on a per-vertex basis, and the integral of the spherical function times visibility for PRT transfer vectors would be computed for each vertex. In general, after the construction of the 4D BVH, discussed above, integrals of the form in equation (1) may be computed at arbitrary spatial locations, with one of the benefits being the ability to mix spatial sampling rates in ways that previously required additional implementation effort. For example, in a scene which includes several objects, some of which have texture parameterizations, the rendering application may easily compute PRT transfer vectors for geometry re-lighting at textels in the parameterization for the objects, and at vertices for all other objects. This also enables integration of PRT normal mapping techniques.

Figure 4:
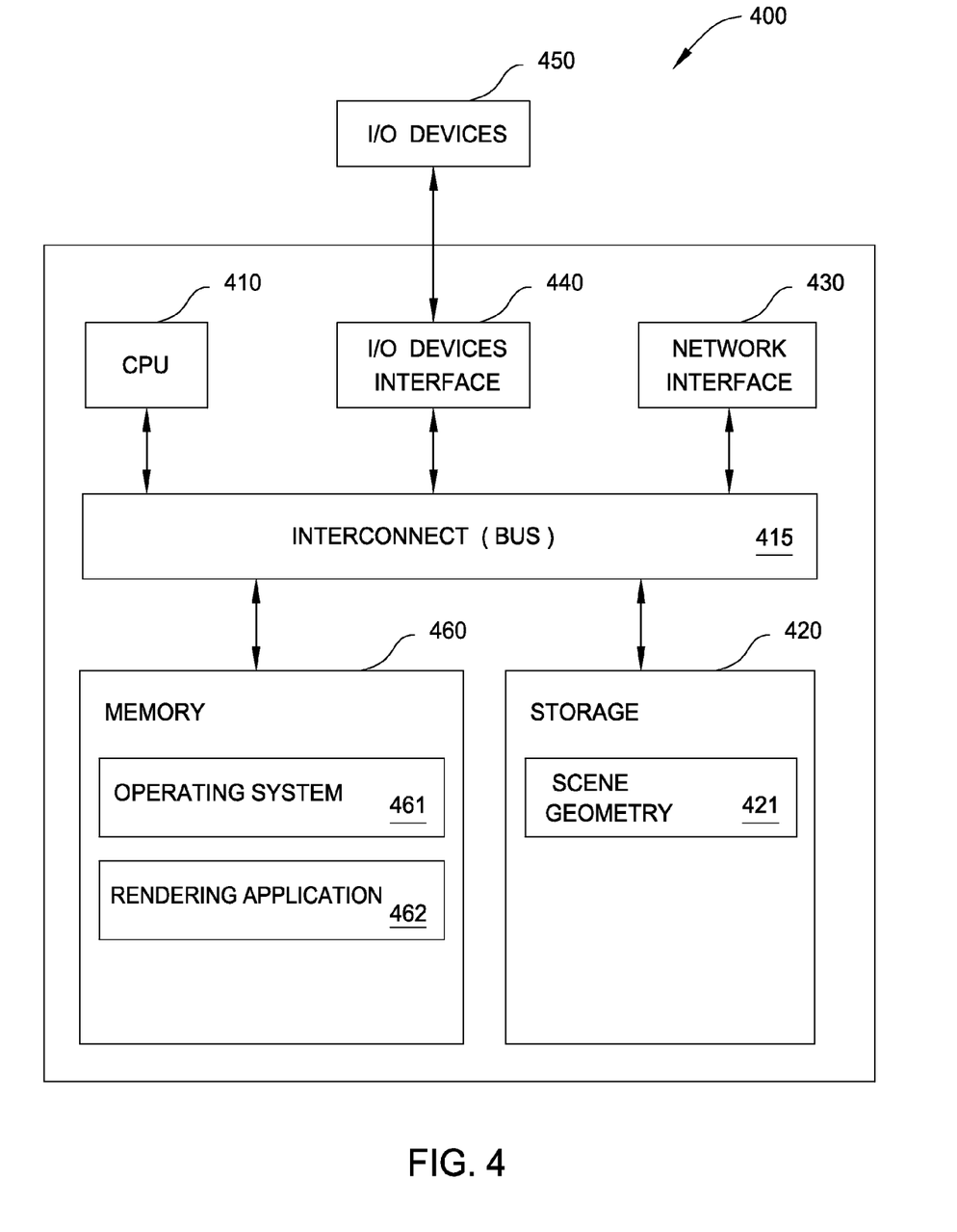
FIG. 4 depicts a block diagram of a system in which an embodiment may be implemented.

FIG. 4 illustrates a system 400 in which aspects of the invention may be implemented. As shown, the system 400 includes, without limitation, a central processing unit (CPU) 410, a network interface 430, an interconnect 415, a memory 460 and storage 420. The system 400 may also include an I/O device interface 440 connecting I/O devices 450 (e.g., keyboard, display and mouse devices) to the system 400.

The CPU 410 retrieves and executes programming instructions stored in the memory 460. Similarly, the CPU 410 stores and retrieves application data residing in the memory 460. The interconnect 415 facilitates transmission, such as of programming instructions and application data, between the CPU 410, I/O device interface 440, storage 420, network interface 430, and memory 460. CPU 410 is included to be representative of a single CPU, multiple CPUs, a single CPU having multiple processing cores, and the like. And the memory 460 is generally included to be representative of a random access memory. The storage 420 may be a disk drive storage device. Although shown as a single unit, the storage 420 may be a combination of fixed and/or removable storage devices, such as tape drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of the system 400 shown in FIG. 4 may be distributed across multiple computing systems connected by a data communications network.

As shown, the memory 460 includes an operating system 461 and a rendering application 462. The rendering application 462 may determine an integral of a visibility-masked spherical function during, e.g., direct illumination, ambient occlusion computations, the precomputation steps of PRT techniques, image relighting, all-frequency diffuse shading, glossy rendering, material editing, etc. In one embodiment, the rendering application 462 may determine a spherical silhouette of visibility from contour edges found by a search over a 4D dual mesh, and determine the integral of the visibility-masked spherical function along the visibility silhouette, according to the method 300 of FIG. 3.

Although discussed above with respect to a CPU, techniques disclosed herein are trivially parallelizable. In one embodiment, a graphic processing unit (GPU) which supports multi-threading may execute a parallel implementation of the rendering application 462.

Advantageously, techniques disclosed herein provide a geometric solution to the problem of determining the spherical visibility function during 3D rendering. As compared to sampling approaches, experience has shown that such a geometric solution may sometimes improve the performance of 3D rendering applications which require integrating visibility-masked spherical functions. Further, performance of techniques disclosed herein does not depend on the function (times visibility) being integrating, and instead depends on the resolution of the function. In addition, unlike sampling approaches, techniques disclosed herein do not produce artifacts in rendered scenes.

While the foregoing is directed to aspects of the present invention, other and further aspects of the invention may be devised without departing from the basic scope thereof, and the scope thereof is determined by the claims that follow.

What is claimed is:

1. A computer-implemented method for rendering a 3D scene, comprising:
   receiving, by a rendering application executing on a processor, geometry of the scene;
   for each of a plurality of shade points in the scene:
   determining a visibility silhouette by determining contour edges and by determining visibility silhouette edges from the contour edges, wherein the visibility silhouette edges define boundaries between visible and occluded regions from a perspective of the shade point and wherein the visibility silhouette edges are determined based on changes in value of an overlap function at intersections between the contour edges and u-isolines of a parameterization, wherein the contour edges are projected onto an octahedron, wherein the parameterization is of the octahedron, wherein the overlap function indicates whether geometry is intersected by a ray originating from the shade point, and wherein the u coordinate of the octahedral parameterization is the x coordinate of the octahedron equation $|x|+|y|+|z|=1$, and
   determining a spherical visibility-masked integral, wherein spherical visibility in the integral is represented by the visibility silhouette; and
   accelerating a rendering of the scene using, at least in part, one or more of the spherical visibility masked integrals of the shade points.

2. The method of claim 1, wherein the contour edges are determined by:
   determining boundary edges of the scene geometry; and
   processing 4D line segment representations of respective non-boundary edges of the scene geometry into a bounding volume hierarchy and querying the bounding volume hierarchy for intersection with a 3D hyperplane normal to the shade point, wherein the 4D line segments have triangles adjacent to the respective edges as endpoints.

3. The method of claim 1, wherein the u-isolines do not cross back from a half-space which is invisible from the perspective of the shade point if the u-isolines cross into the invisible half-space.

4. The method of claim 1, wherein the integral is determined during one of glossy rendering, material editing, image relighting, all-frequency diffuse shading, and ambient occlusion computation.

5. A computer-implemented method for rendering a 3D scene, comprising:
   receiving, by a rendering application executing on a processor, geometry of the scene;
   for each of a plurality of shade points in the scene:
   determining a visibility silhouette by determining contour edges and by determining visibility silhouette edges from the contour edges, wherein the visibility silhouette edges define boundaries between visible and occluded regions from a perspective of the shade point and wherein the visibility silhouette edges are determined based on changes in value of an overlap function at intersections between the contour edges and u-isolines of a parameterization, wherein the contour edges are projected onto a sphere, wherein the parameterization is of the sphere, and wherein the overlap function indicates whether geometry is intersected by a ray originating from the shade point, and
   determining a spherical visibility-masked integral, wherein spherical visibility in the integral is represented by the visibility silhouette; and
   accelerating a rendering of the scene using, at least in part, one or more of the spherical visibility masked integrals of the shade points.

6. The method of claim 5, wherein the u-isolines do not cross back from a half-space which is invisible from the perspective of the shade point if the u-isolines cross into the invisible half-space.

7. The method of claim 5, wherein determining the integral includes integrating a spherical function over segments of the u-isolines where the overlap function indicates the ray originating from the shade point does not intersect any scene geometry.

8. A non-transitory computer-readable storage medium storing instructions, which when executed on a processor, perform operations for rendering a 3D scene, comprising:
   receiving, by a rendering application, geometry of the scene;
   for each of a plurality of shade points in the scene:
   determining a visibility silhouette by determining contour edges and by determining visibility silhouette edges from the contour edges, wherein the visibility silhouette edges define boundaries between visible and occluded regions from a perspective of the shade point and wherein the visibility silhouette edges are determined based on changes in value of an overlap function at intersections between the contour edges and u-isolines of a parameterization, wherein the contour edges are projected onto an octahedron, wherein the parameterization is of the octahedron, wherein the overlap function indicates whether geometry is intersected by a ray originating from the shade point, and wherein the u coordinate of the octahedral parameterization is the x coordinate of the octahedron equation $|x|+|y|+|z|=1$, and
   determining a spherical visibility-masked integral, wherein spherical visibility in the integral is represented by the visibility silhouette; and
   accelerating a rendering of the scene using, at least in part, one or more of the spherical visibility masked integrals of the shade points.

9. The computer-readable storage medium of claim 8, wherein the contour edges are determined by:
   determining boundary edges of the scene geometry; and
   processing 4D line segment representations of respective non-boundary edges of the scene geometry into a bounding volume hierarchy and querying the bounding volume hierarchy for intersection with a 3D hyperplane normal to the shade point, wherein the 4D line segments have triangles adjacent to the respective edges as endpoints.

10. The computer-readable storage medium of claim 8, wherein the u-isolines do not cross back from a half-space which is invisible from the perspective of the shade point if the u-isolines cross into the invisible half-space.

11. The computer-readable storage medium of claim 8, wherein the integral is determined during one of glossy rendering, material editing, image relighting, all-frequency diffuse shading, and ambient occlusion computation.

12. A system, comprising:
  a processor; and
  a memory, wherein the memory includes an application program configured to perform operations for rendering a 3D scene, comprising:
    receiving, by a rendering application, geometry of the scene;
    for each of a plurality of shade points in the scene:
      determining a visibility silhouette by determining contour edges and by determining visibility silhouette edges from the contour edges, wherein the visibility silhouette edges define boundaries between visible and occluded regions from a perspective of the shade point and wherein the visibility silhouette edges are determined based on changes in value of an overlap function at intersections between the contour edges and u-isolines of a parameterization, wherein the contour edges are projected onto an octahedron, wherein the parameterization is of the octahedron, wherein the overlap function indicates whether geometry is intersected by a ray originating from the shade point, and wherein the u coordinate of the octahedral parameterization is the x coordinate of the octahedron equation $|x|+|y|+|z|=1$, and
      determining a spherical visibility-masked integral, wherein spherical visibility in the integral is represented by the visibility silhouette; and
    accelerating a rendering of the scene using, at least in part, one or more of the spherical visibility masked integrals of the shade points.

* * * * *

UNITED STATES PATENT AND TRADEMARK OFFICE
CERTIFICATE OF CORRECTION

PATENT NO. : 9,501,862 B2  
APPLICATION NO. : 13/692482  
DATED : November 22, 2016  
INVENTOR(S) : Derek Nowrouzezahrai et al.

It is certified that error appears in the above-identified patent and that said Letters Patent is hereby corrected as shown below:

In the Specification

In Column 3, Line 46, delete "dω," and insert -- dω. --, therefor.

In Column 4, Line 38, after " $I = \int_{\mathcal{M}} \left( \int_{\{v | V(u,x)=1\}} f(u,v) I(u,v) dv \right) du$, " insert -- , --.

In Column 8, Line 17, delete "$(u^2+v^2+(1-|u\equiv-|v|)^2)^{1.5}$." and insert -- $(u^2 + v^2 + (1 - |u/ - |v|)^2)^{1.5}$. --, therefor.

Signed and Sealed this
Twenty-first Day of February, 2017

Michelle K. Lee
*Director of the United States Patent and Trademark Office*